United States Patent
Anspon et al.

[11] 3,876,452
[45] Apr. 8, 1975

[54] ARTICLES COATED WITH HYDRALYZED COPOLYMER OF ETHYLENE AND ALKYL ACRYLATE

[75] Inventors: Harry D. Anspon, Sewickley, Pa.; Jack Hurst, Houston, Tex.

[73] Assignee: Gulf Oil Corporation, Pittsburgh, Pa.

[22] Filed: Apr. 5, 1973

[21] Appl. No.: 348,048

Related U.S. Application Data

[63] Continuation of Ser. No. 710,396, March 4, 1968, abandoned, which is a continuation of Ser. No. 285,803, June 5, 1963, abandoned, which is a continuation-in-part of Ser. No. 131,108, Aug. 14, 1961.

[52] U.S. Cl........ 117/76 P; 117/122 H; 117/132 C; 117/138.8 E; 117/138.8 UA; 117/138.8 F; 117/138.8 N; 117/143; 117/144; 117/155 UA; 260/86.7; 260/80.73; 156/334; 161/216; 161/247; 161/249; 161/250; 161/231; 161/227

[51] Int. Cl. .................. B32b 27/06; C09j 3/14

[58] Field of Search ........... 161/216, 227, 231, 247, 161/249, 250, 251, 252, 253, 354; 117/138.8 G, 132 C, 76 P, 122 H

[56] References Cited
UNITED STATES PATENTS

| | | | |
|---|---|---|---|
| 3,041,208 | 6/1962 | Hay | 117/138.8 E |
| 3,201,498 | 8/1965 | Brunson et al. | 161/249 X |
| 3,215,678 | 11/1965 | Adelman | 161/216 X |
| 3,249,570 | 5/1966 | Potts | 260/80.8 X |
| 3,264,272 | 8/1966 | Rees | 260/78.5 |
| 3,344,014 | 9/1967 | Rees | 161/203 |
| 3,442,745 | 5/1969 | Salyer et al. | 156/334 X |
| 3,503,529 | 3/1970 | Brown | 161/252 X |

FOREIGN PATENTS OR APPLICATIONS

| | | |
|---|---|---|
| 836,988 | 4/1938 | France |
| 678,279 | 5/1949 | United Kingdom |

Primary Examiner—George F. Lesmes
Assistant Examiner—Alan T. McDonald

[57] ABSTRACT

This invention relates to certain coated articles of manufacture and laminated structures. More particularly, this invention relates to such articles in which the coating or the binding layer of the laminated structure consists of ethylene polymers containing therein carboxylate groups and optionally amide and/or ester groups. The ethylene polymers are prepared by the alkaline hydrolysis of ethylene-alkyl acrylate copolymers.

32 Claims, 4 Drawing Figures

ARTICLES COATED WITH HYDRALYZED COPOLYMER OF ETHYLENE AND ALKYL ACRYLATE

This application is a continuation of our application, Ser. No. 710,396, filed Mar. 4, 1968, now abandoned which in turn is a continuation of our application, Ser. No. 285,803, filed June 5, 1963, now abandoned, which in turn is a continuation-in-part of our application, Ser. No. 131,108, filed Aug. 14, 1961.

It is an object of this invention to provide novel coated articles of manufacture in which the coating comprises an ethylene polymer of a particular type as subsequently described.

Another object of this invention is to provide novel coated polymers in which the coating comprises an ethylene polymer of a particular type as subsequently described.

A further object of this invention is to provide paper bearing a coating of an ethylene polymer of a particular type as subsequently described.

Yet another object of this invention is to provide laminated structures in which at least two of the laminae are bonded together with an ethylene polymer of a particular type as subsequently described.

A still further object of this invention is to provide processes for preparing novel coated articles and novel laminated structures as above described.

Other objects and advantages of the invention will be apparent from the following description thereof when read in conjunction with the attached drawings in which.

The above and related objects are attained by coating an appropriate substrate or bonding together at least two lamina with an ethylene polymer containing along its polymer chain pendant carboxylate groups (which may be in a free acid or salt form), optionally pendant amide groups, and optionally pendant ester groups, all within prescribed molar ratios as subsequently described. For convenience and brevity of expression, in the following descriptions of the invention such polymers frequently will be referred to simply as Ethylene Polymers.

Figure 1:
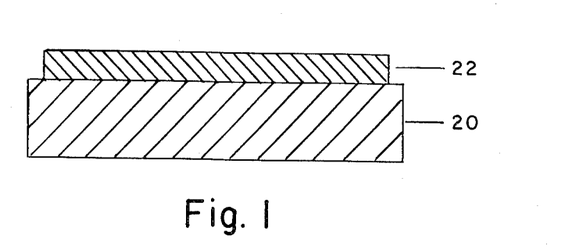
FIG. 1 is a coated article prepared in accordance with the present invention.
Figure 2:
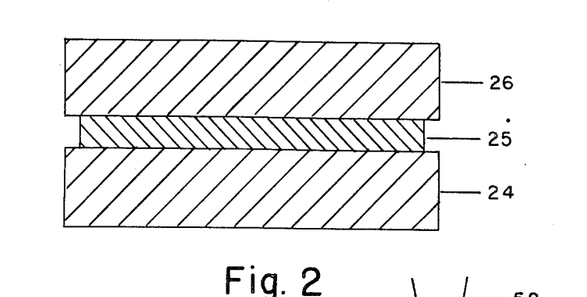
FIG. 2 is a laminated structure manufactured in accordance with the present invention.

Referring to the drawings, in FIG. 1 there is provided a substrate 20, which typically will be a film of a low density ethylene homopolymer (having a density in the range of about 0.91 to about 0.94) bearing thereon a coating 22 of an Ethylene Polymer. In FIG. 2 there are provided two laminate 24 and 26 which are bonded together with Ethylene Polymer 25. Laminae 24 and 26 may be films of a low density ethylene homopolymer as described in FIG. 1.

Figure 3:
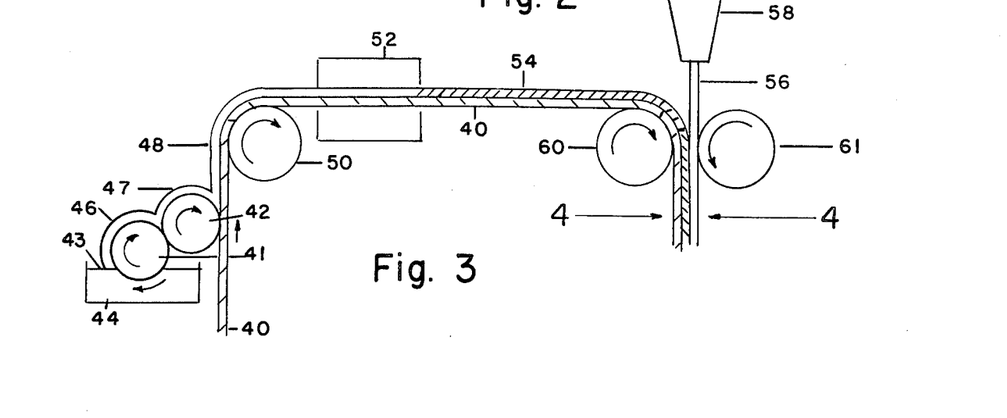
FIG. 3 is a schematic drawing of a method for preparing a paper-polyethylene laminated structure in accordance with the present invention.

FIG. 3 illustrates a method for preparing a polyethylene coated paper board of the type employed in making milk cartons in which the adhesion of the polyethylene coating to the paper board is improved by means of an intermediate coating of an Ethylene Polymer carried on the paper board. Paper board 40 (from a source not shown) is advanced at a high rate of speed in the direction shown. Typically, paper board 40 will be advanced at a rate of 800 ft./min. A uniform film 48 of an aqueous dispersion of an Ethylene Polymer is applied to one surface of paperboard 40 by means of a reverse-roll coater. The reverse-roll coater consists of rolls 41 and 42 which rotate in the direction shown. Roll 41 dips into a reservoir 43 of an aqueous dispersion of the Ethylene Polymer which is contained in supply tank 44. When roll 41 leaves reservoir 43, it carries a thin film 46 (shown in exaggerated thickness) of the aqueous dispersion of the Ethylene Polymer. When roll 42 passes the nip formed between rolls 41 and 42, a thin film 47 (again shown in exaggerated thickness) of the aqueous dispersion of the Ethylene Polymer is transferred to the surface of roll 42. As paperboard 40 passes roll 42, a thin uniform film 48 of the aqueous dispersion of the Ethylene Polymer is transferred to the surface of paperboard 40.

The coated paperboard, after passing over roll 50, advances through an oven 52. Typically, the oven is maintained at a temperature of about 300°–550°F. and evaporates the water from the film 48 and fuses the polymer solids to provide a coating 54 of the Ethylene Polymer. A film 56 of polyethylene which is extruded from extruder 58 is laid down on the top surface of coating 54. The assembly next passes between the nip of rolls 60 and 61 to firmly bond the polyethylene film 56 to the substrate.

Figure 4:
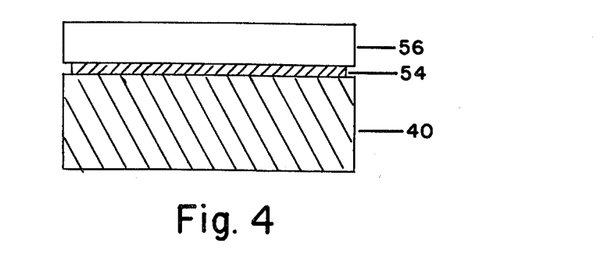
FIG. 4 is a sectional view, in exaggerated thickness, taken through line 4—4 of FIG. 3.

FIG. 4, which is a sectional view taken through line 4—4 of FIG. 3, shows an exaggerated scale the relative thicknesses of the Ethylene Polymer coating and the extruded polyethylene film which is bonded to the substrate by means of the coating.

A series of aqueous emulsions of Ethylene Polymers are prepared for use in the examples, according to the following procedures:

A. An aqueous emulsion of an Ethylene Polymer made by copolymerization of ethylene with 20 percent methyl acrylate is prepared by heating in a stirred autoclave at 240°C. for 6 hours a mixture of the following: Ethylene Polymer, 20 lb., water, 90 lb., 28% ammonium hydroxide, 12 lb., sodium hydroxide, 300 grams. For coating polyolefin film, addition of 10–15% isopropanol to the emulsion is preferred.

B. An aqueous emulsion of the Ethylene Polymer made by copolymerization of ethylene with 20 percent methyl acrylate is prepared by heating in a stirred autoclave at 240°C. for 6 hours a mixture of the following: Ethylene Polymer, 22 lb.; water, 90 lb., potassium hydroxide, 1,320 grams. Upon cooling and withdrawal from the reactor the emulsion is ready for use.

C. An aqueous emulsion of an Ethylene Polymer made by copolymerization of ethylene with 22–23 percent by weight methyl acrylate is prepared by heating in a stirred autoclave at 240°C. for 6 hours a mixture of the following: Ethylene Polymer, 20 lb.; water, 90 lb.; ammonium hydroxide, 12 lb.; sodium hydroxide, 300 grams. The resulting emulsion normally contains about 16% solids. If desired, water may be evaporated to a solids content of 25% or more.

D. An Ethylene Polymer made by copolymerization of ethylene with 40 to 50 percent methyl acrylate is emulsified according to the following procedure: In a stirred autoclave there is heated at 230°C. for 8 hours a mixture of Ethylene polymer, 5.0 g.; sodium hydroxide, 1.05 g. and water, 25.0 ml. The resulting product mixture is cooled and filteredto yield a stable emulsion.

E. An Ethylene Polymer made by copolymerization of ethylene with between 40 and 50 percent methyl acrylate is emulsified according to the following procedure: In a stirred autoclave there is heated for 8 hours at 230°C. a mixture of Ethylene Polymer, 5.0 g., sodium hydroxide, 0.26g.; 28% ammonium hydroxide, 20.0 ml. and water, 7.5 ml. Upon cooling and filtration of the resulting mixture, there is obtained a polymer emulsion which is ready for use.

F. An Ethylene Polymer made by copolymerization of Ethylene with between 40 and 50 percent methyl acrylate is emulsified according to the following procedure: In a stirred autoclave there is heated for 8 hours at 230°C. a mixture of Ethylene Polymer, 5.0 g.; sodium hydroxide, 0.70 g. and water, 25.0 ml. After cooling and filtration, a stable emulsion is obtained which is ready for use.

G. An Ethylene Polymer made by copolymerization of ethylene with 12.8 percent methyl acrylate is emulsified by heating in a stirred autoclave at 250°C. for 6 hours the following mixture: Ethylene Polymer, 350 g.; sodium hydroxide, 10.4 g.; water 900 ml. and 28% ammonium hydroxide, 700 ml. After cooling the resulting emulsion is ready for use.

H. The Polymer emulsion exemplified in A. above is coagulated by acidification, preferably with a strong acid, filtration and the recovered solid material is dried at 40°C. to yield an Ethylene Polymer powder. This powder is stable in storage, being readily convertible to an emulsion, for example, by the following procedure: There is placed in a laboratory homogenizer 700 ml. of water and 38 g. of a 50 percent solution of choline in methanol. The polymer powder is wetted with methanol and added gradually to the mixture with the pressure drop across the valve set at approximately 4,000 p.s.i. A stable emulsion is formed readily.

I. An Ethylene Polymer made by copolymerization of ethylene with 20 percent methyl acrylate is emulsified according to the following procedure: The following mixture is heated for 3 hours at 180°C. and for 3 hours at 230°C. in a stirred autoclave: Ethylene Polymer, 200 g.: water, 600 ml.; choline, 200 g.; 28% ammonium hydroxide, 600 ml. An emulsion is formed which has a light yellow color.

The following examples are set forth to illustrate more clearly the principle and practice of this invention to those skilled in the arts. Unless otherwise noted, where parts of quantities are mentioned, they are parts or quantities by weight.

EXAMPLE 1

Part A

A 1.25 mil. film of polyethylene (having a density of 0.925) is uniformly coated on one side with Polymer Emulsion A and dried in a forced air oven maintained at 220°F. to provide a coating of a 1 lb./1,000 ft$^2$. The coated film, as observed from the coated side, is substantially clearer and has substantially brighter gloss than the uncoated film. Printing is then applied to the coated side of the film, without further treatment, yielding a durable printed surface to which the printing is sufficiently adherent to pass the adhesive tape test.

Part B

Two assemblies of polyethylene film are prepared, one being an assembly of films prepared in Part A above (with the coated surfaces touching each other) and the second assembly being of the uncoated polyethylene films. A series of heat seals are made with both assemblies employing a Pack-Rite Robot Jaw Sealer.

The two assemblies are heated for one second at 235°F. No bond is obtained between the uncoated polyethylene films. A seal is obtained between the coated polyethylene films. The two assemblies are heated for 0.5 sec. at 250°F. Excellent seals are obtained with both assemblies.

The two assemblies are heated for 0.5 sec. at 275°F. While a seal is obtained with the uncoated polyethylene films, "burn through" also is obtained as a result of excessive melting of the polyethylene. On the other hand, a good seal is obtained with the coated polyethylene films with no "burn through."

The above data establish that seals are obtained between the coated film at lower temperatures than can be employed with uncoated polyethylene film. Moreover, higher sealing temperatures can be employed with the coated film without the attendant problem of "burn through." This is an important observation as "burn through" is frequently encountered in heat sealing polyethylene film in commercial practice.

EXAMPLE II

Films approximately 1.25 mil. thick of several polymer species are coated on one side with Ethylene Polymer Emulsion A to provide a dry coating weight of 1 lb./1,000 ft.$^2$. Assemblies of two pieces of each of the films are prepared with the coated surfaces touching and heat seals are made with the equipment described in Example I, Part A. In each case, a good heat seal is obtained.

The polymer species tested are set forth in Table II. Heat Sealing conditions employed were 275°F., 1 sec. at 10 p.s.i.g.

Table II

Polymer Species

Nylon 6
Polyethylene Terephthalate
Polypropylene
Cellophane
Cellulose acetate
Linear polyethylene
Polymethyl methacrylate
Polyvinyl alcohol
Polycarbonate
Polyurethane
Copolymer of 80% Vinylidine chloride and 20% vinyl chloride Comparable results are obtained when the films are similarly coated with any of Ethylene Polymer Emulsions B, C, D, or E.

Part B

Each of the coated films prepared in Part A above is assembled with a 1.25 mil film of uncoated polyethylene. The assemblies are heat sealed employing the apparatus described in Example I, Part B. A pressure of 10 psig is used for 0.5 second with a sealing temperature of 250°F.

EXAMPLE III

Part A

Paper stock having a basis weight of 27 pounds/3,000 ft.$^2$ is coated on both sides with Polymer Emulsion A and heated at 300°F. to evaporate the water and fuse the polymer solids. The coating on each surface weighs 6 pounds/3,000 ft.$^2$. Two sheets on the coated paper are assembled and sealed by heating for 0.5 second at 300°F. under an applied pressure of 30 psi. The bond can not be physically separated without first causing fiber failure.

Part B

A package having a volumetric capacity of 10 fluid ounces is prepared by heat sealing an assembly of two sheets of paper from Part A on three sides. The package is filled with 8 fluid ounces of chili con carne of a high fat content and the fourth side is then heated to seal the package. The package is maintained in boiling water for 30 minutes. After this treatment, the package still has good mechanical strength.

Part C

The coated paper of Part A is assembled with 1 mil aluminum foil and heated for 1 second at 300°F. under an applied pressure of 40 psi. A firm bond is obtained between the two films. When an attempt is made to separate the assembly, the paper fails before the bond formed between the paper and the aluminum foil.

EXAMPLE IV

Assemblies are prepared between uncoated paper having a weight of 27 pounds/3,000 ft.$^2$ and each of the coated polymer films prepared in Example II, Part A. An assembly is also prepared with the same paper and the coated polyethylene film described in Example I, Part A. With each assembly the coated surface of polymer film is placed in contact with the paper. Each assembly is heat sealed to obtain a good bond between the polymer film and the paper. In each case the sealing conditions employed are identical with those previously reported for sealing the coated polymer films to themselves.

EXAMPLE V

Part A

Forty pound bleached kraft paper is coated on one side with Ethylene Polymer Emulsion A to give a coating of 10 pounds of polymer solids/3,000 ft.$^2$. A package is prepared by creasing and folding the paper so that the coated surfaces touch and the bottom and one side are then heat sealed. The package is filled with SAE 30 Motor Oil and then heat sealed. The package is stored for 6 months with no leaks occurring and no bleed through of the oil being observed.

Part B

Part A is repeated except that oil is deliberately placed in the heat seal zone. Comparable results are obtained with the oil having no observable effect on the seal. A satisfactory heat seal is also obtained when the sealing surfaces are wet with milk. Similar results are obtained when liquid corn oil is packaged in the same manner.

EXAMPLE VI

In a continuous operation 0.35 mil. aluminum foil is coated on one side with Ethylene Polymer Emulsion A to provide a coating of 1 pound of polymer solids/1,000 ft.$^2$. The coated foil without drying is assembled with the coated surface in engagement with 25 pound kraft paper and passed through a nip roll. The laminate containing the wet Ethylene Polymer is then continuously passed through a drying tunnel at 350°F. The residence time of the assembly in the heated zone is 5 seconds. A paper-aluminum foil laminate suitable for use in packaging is thus produced continuously at high speed. The bond so obtained is so strong that paper failure is obtained in attempting to delaminate the structure.

EXAMPLE VII

In a continuous operation 0.35 mil. aluminum foil is coated on one side with Ethylene Polymer Emulsion A to provide a coating of 1 pound of polymer solids/1,000 ft.$^2$. The wet, emulsion-coated foil is assembled with the coated surface in engagement with 25 pound kraft paper and passed through a nip roll. The laminate containing the wet Ethylene Polymer is then continuously passed through a drying tunnel at 350°F. and through calender rolls in which the roll temperature is maintained at 250°F. A paper-aluminum foil laminate suitable for use in packaging is thus produced continuously at high speed. The bond so obtained is so strong that paper failure is obtained in attempting to delaminate the structure.

EXAMPLE VIII

Part A

Cold rolled steel, brass and aluminum strips 1/16 inch thick are coated on one side with Ethylene Polymer Emulsion A and dried at 250°F. to provide a coating of one pound of polymer solids/1,000 ft.$^2$. The coated side of the metal is placed in contact with 1/16 inch birch veneers and the assemblies are heated for 1 minute at 300°F. under a pressure of 50 psig. Strong bonds are obtained between the wood and the metal.

Part B

Extruded polymer film (3 mil.) of Ethylene Polymer derived from a copolymer of ethylene with 20 percent methyl acrylate was employed as a laminating adhesive to bond aluminum foil to plywood at 350°F., maintaining a force of 8 tons on a 6×6 inch platen for a period of 2 minutes. A strong bond was obtained which showed no tendency to delaminate, even after repeated expansion and contraction of the plywood with changing humidity.

EXAMPLE IX

Two pieces of 8 oz. cotton drill cloth were laminated with an Ethylene Polymer in the form of a powder obtained from an emulsion by drying. The polymer powder was spread over one piece of cloth, the other piece was laid on top and the assembly was laminated by heating at about 300°F. under approximately 50 p.s.i.g. pressure. The laminated cloth was then placed in a ball mill containing steel balls and trichloroethylene solvent. After ball milling for 40 hours, the fabric was badly frayed but the laminating polymer continued to resist both the solvent and the severe milling, having

EXAMPLE X

Part A

Ethylene Polymer Emulsion A is admixed with several commercial latexes to provide mixed emulsions containing, on a solid basis, 50% of the Ethylene Polymer and 50% of the second polymer species. The second polymer species employed are Butyl rubber, a 75/25 butadiene-styrene rubber, a vinylidine chloride-vinyl chloride copolymer latex (Daran 202) and ethyl acrylate homopolymer latex.

Part B

Sheets of 25 pound kraft paper are coated on one side with each of the mixed aqueous polymer dispersions prepared in Part A above to provide a coating of 10 pounds of polymer solids/3,000 ft.² The coated papers thus obtained can be heat sealed to themselves and to aluminum foil. The coated papers have excellent MVT properties, which properties are retained even after the papers are creased.

The Ethylene Polymers employed as the coating and/or bonding agent in the present invention are described in copending application Ser. No. 131,108, filed Aug. 14, 1961 (assigned to the assignee of the present application) and that description is incorporated herein by reference. Such Ethylene Polymers contain pendant carboxylate groups along the polymer chain. Preferably the Ethylene Polymers also will contain pendant amide groups. Optionally, the Ethylene Polymers also may contain pendant ester groups.

The structure of the Ethylene Polymers can be represented as containing groups of the structures:

wherein R is selected from the group consisting of hydrogen and alkyl groups, $R_1$ is selected from the group consisting of hydrogen and cations, $R_2$ and $R_3$ are independently selected from the group consisting of hydrogen, hydroxyalkyl and hydrocarbon groups with the further provisions that $R_2$ and $R_3$ may be combined with N in a heterocyclic group, and $R_4$ is a hydrocarbon group. $R_1$ typically may be a sodium; potassium; lithium; ammonium; substituted ammonium or a quaternary ammonium ion. $R_1$ may also be a multivalent cation, as, for example, magnesium, calcium or aluminum. $R_2$, $R_3$ and $R_4$ typically may be alkyl groups, e.g., methyl, ethyl, butyl, etc.; aryl group, e.g., phenyl, naphthyl, tolyl, etc.; alkenyl groups such as allyl; hydroxyalkyl, e.g., hydroxyethyl and hydroxypropyl; and aralkyl, e.g., benzyl. Examples of $R_2$ and $R_3$ being combined with the nitrogen in a heterocyclic group include the amides prepared from piperidine, morpholine, pyrrolidine, etc.

The groups of the formulae (b), (c), and (d) are present in a ratio of from about 0.01 to about 0.50 mol per mol of group (a). The ratio of the groups is selected so that the Ethylene Polymer will be soluble or at least colloidally dispersable at 50°C. in water when the groups of formula (b) are in salt form. Preferably the ratio of substituent groups is selected so that an aqueous dispersion of about 20% solids content has the following properties: Viscosity less than about 20,000 centipoises, preferably less than 2,000. For convenience in use in coating machines, a viscosity of 200 to 1,000 centipoises is preferred. On filtration through a 100 to 200 mesh screen, no more than about 5% solids should be retained on the screen, preferably 0%. (Retained solids usually become dispersed on recycling to the emulsification step). When the ratio of substituent groups is such as to cause the dispersion to approach a true solution, rather than an emulsion, the viscosity at 20% solids content may be too high for convenient use in conventional coating equipment.

In the Ethylene Polymers of maximum utility for the present invention, the groups of the formulae (b), (c) and (d) will be present in the ratio of about 0.025 to about 0.25 mol per mol of group (a) and more especially in a ratio of from about 0.04 to about 0.15 mol per mol of group (a).

The groups of the formulae (b), (c) and (d) may consist of 100% of group (b) although ordinarily such groups will constitute 10–95 mol % and more especially 20–80 mol % of the total of (b), (c) and (d). Groups of the formula (c) may constitute up to about 90 mol % although ordinarily such groups will constitute 5–90 mol % and more especially 5–70 mol % of the total of (b), (c) and (d). Groups of the formula (d) may constitute up to about 85 mol % of the total of (a), (b) and (c), although ordinarily they will not constitute in excess of about 20 mol % of the total of (b), (c) and (d).

The preferred Ethylene Polymers will contain both carboxylate groups (preferably in sodium or potassium salt form) and amide groups and may be represented by the formula:

The Ethylene Polymers can be prepared by hydrolyzing a copolymer of ethylene with an ester of acrylic or an alphasubstituted acrylic acid in the presence of a strong base such as an alkali metal hydroxide or a quaternary ammonium hydroxide and optionally ammonia or an amine. The hydrolysis can be run at elevated temperatures of 180°C. or even higher. It is desirable to provide agitation as the ethylene-acrylate ester copolymer originally charged to the hydrolysis reaction is insoluble in the liquid hydrolysis medium. The quantity of strong base which is employed is that required to convert the desired number of ester groups to the salt form. The ammonia or amine (if used) is employed preferably in excess of that stoichiometrically required to convert the acrylate ester groups to amide or substituted amide groups.

The Ethylene Polymers as prepared by the process described above are obtained directly in the form of aqueous dispersions which are suitable for use as coating compositions. If desired, the polymer solids can be recovered by drying or coagulating the polymer dispersion with acids. The recovered polymer solids can be employed in the form of dry powder, or may be compression molded or extruded. They may also be redispersed by heating with agitation in water containing sufficient alkali to effect conversion of carboxy groups to the salt form. Alternatively, the Ethylene Polymer solids can be dissolved in suitable organic solvents such as xyleneacetic acid, toluene-isopropanol, toluene-2-butanone, and xylene-m-cresol.

If desired, pigments, fillers, and/or other polymers can be incorporated into the Ethylene Polymer coating solutions or dispersions before use. In using aqueous dispersions of the Ethylene Polymers as paints, it is frequently desirable to incorporate into the coating composition substances that are capable of cross-linking the Ethylene Polymer, e.g., aldehydes such as formaldehyde. Minor quantities of surfactants and/or organic solvents can be incorporated into the aqueous coating compositions for purposes which will be subsequently described.

If desired, the polymers may be coagulated by addition of salts of polyvalent metals, or by use of concentrations of alkali metal hydroxides which are near the saturation point. In the latter instance, the polymer solids may be recovered by filtration and drying to yield a powder which is readily dispersible in plain water.

The substrates that are coated with the Ethylene Polymers in the present invention are members of the following groups of materials:
1. Cellulose, particularly wood, paper and cellophane,
2. Cellulose esters, particularly cellulose acetate, cellulose nitrate, cellulose propionate, and cellulose acetatebutyrate,
3. Cellulose ethers, particularly methyl cellulose and carboxylatemethyl cellulose,
4. Metals, particularly aluminum, steel, zinc, copper, brass, and bronze,
5. Thermoplastic polyesters, particularly polyethylene terephthalate,
6. Thermoplastic polycarbonates, particularly the currently commercially available materials prepared by reacting phosgene with bisphenols.
7. Polyurethanes, particularly those prepared by reacting polyesters or polyethers with polyisocyanates such as toluene di-isocyanate,
8. Thermoplastic formaldehyde homopolymers and copolymers, particularly the currently commercially available materials such as Delrin and Celcon,
9. Thermoplastic polyamides, particularly homopolymers and copolymers of caprolactam and the condensates of hexamethylene diamine and adipic acid,
10. Polyvinyl alcohol, and
11. Thermoplastic addition polymers having polymerized therein at least 25 mol % of at least one monomer selected from the groups consisting of:
   a. 2–4 carbon atom monoolefins, e.g., ethylene propylene, and isobutylene,
   b. Vinyl halides, e.g., vinyl chloride,
   c. Vinylidene halides, e.g., vinylidene chloride,
   d. Styrene and substituted styrenes, e.g., styrene itself, alpha-methylstyrene, ring-alkyl substituted styrenes such as vinyl toluene, and ring-halo substituted styrenes such as 2,5-dichlorostyrene, and
   e. Esters of acrylic and alpha-alkyl substituted acrylic acids, e.g., methyl acrylate, lauryl acrylate, methyl methacrylate, butyl methacrylate, and stearyl acrylate.

The substrates above described can be coated with the Ethylene Polymers by a variety of methods which will be apparent to those skilled in the art. For example, a coated article can be prepared by laying down an aqueous dispersion of the Ethylene Polymer on the substrate surface and evaporating the water therefrom. Alternatively, an organic solvent solution of the Ethylene Polymer can be laid down on the substrate surface and the solvent evaporated therefrom. When employing an aqueous dispersion of the Ethylene Polymer as the coating composition, it is frequently desirable to incorporate therein a small quantity of a water-miscible organic solvent or a surfactant to improve the spreadability of the aqueous dispersion on hydrophobic surfaces. Alcohols, glycols, aldehydes, amines and aminoalcohols can be used for this purpose. Where it is desired to have a continuous fused film of the Ethylene Polymer on the substrate, the coated article should be heated to at least 60°C. and preferably to at least 100°C.

The coated articles of the present invention have many outstanding properties. Almost without exception, the coatings laid down on the substrate are glossy, tough, flexible and heat sealable, either to themselves or to any of the substrates above noted. The coatings also have excellent resistance to mineral and vegetable oils.

Paper coated with an Ethylene Polymer constitutes a preferred embodiment of the invention. As noted in the Examples, such coated papers have excellent MVT values. Typically, paper coated at a weight of 10 pounds/ream (3,000 ft.$^2$) has an MVT value of 10 grams/square meter/24 hours/1 mil thickness (at 50% rel. humidity on one side and 0% on the other at 78°F). These values are maintained even after creasing the coated paper. The coated paper has excellent resistance to mineral and vegetable oils. The combination of low MVT values and good oil resistance makes the coated papers particularly useful in the packaging arts. Paper coated with an Ethylene Polymer at the rate of one pound/ream (3,000 ft.$^2$) is heat sealable to itself. Thus the coated paper can be used to prepare heavy duty laminated multiwall bags.

The good heat sealing characteristics of the coating makes the coated papers of the invention especially useful in the manufacture of special heat sealed packages. An excellent example of such an application is the manufacture of individual size packets of sugar. For this purpose, the coating can be printed on the paper stock at low cost only in the areas that are ultimately to be heat sealed.

Polyolefins and particularly polyethylene that are coated with an Ethylene Polymer constitute another preferred embodiment of the invention. Coated polyethylene film, particularly blow extruded polyethylene film, has an improved aesthetic appearance inasmuch as the coating has excellent gloss and improves the clarity of the coated film. The coated polyolefins possess excellent oil resistance and good printability. For these reasons, coated polyolefin films are excellent materials for use in packaging fatty foods. Blown polyolefin bottles that have been coated with an Ethylene Polymer show promise for use in packaging fatty foods such as liquid vegetable oils.

Yet another coated article of unusual interest is coated nylon film. Such coated film has shown excellent properties for use in packaging meat products such as wieners and cold cuts.

Coated polypropylene has interesting characteristics in that, when heat sealed, the seal can be separated without destroying the substrates. Thus, coated polypropylene films can be used to manufacture resealable packages.

Cellophane that has been coated with an Ethylene Polymer has improved water resistance and can be readily heat sealed. These properties are obtained with no reduction in the excellent optical properties of the cellophane substrate.

One problem associated with the use of many plastic films in the packaging of fatty foods such as meat is that the fatty oils bleed through the film and cause the printing on the exterior surface to lift therefrom. Heretofore it has been necessary to employ costly lacquers on the exterior surface of many film packages to ameliorate this problem. The coated polymer films of the present invention will do an equivalent or superior job for this purpose at a substantially lower cost. For this purpose, the coating need be applied only on the areas of the film which subsequently will be printed.

The laminates of the invention consist of two or more laminae which are bonded together with an Ethylene Polymer. The laminae can be fabricated from any of the materials employed as substrate in the coated articles and previously described.

The laminated structures are usually prepared by laying down a coating of the Ethylene Polymer on one lamina and subsequently placing the coated lamina against the second lamina (which also may be coated with an Ethylene Polymer) and heating under at least light pressure. It is not essential, however, to prepare a coated lamina first as it is perfectly feasible to simply distribute solid particles of the Ethylene Polymer on the one lamina, to place the second lamina on top thereof and finally to heat under pressure. In another embodiment of the invention, films or tapes of the Ethylene Polymer can be interposed between two laminae before they are subjected to heat and pressure.

The laminates thus prepared are firmly bonded together and ordinarily can not be separated without destroying at least one of the laminae. The laminates prepared from two nylon, polyethylene terephthalate or polypropylene films are an exception to this generalization as previously described. The specific laminated structures illustrated in the examples represent the presently preferred laminated structures. The aluminum foil-paper laminates are extremely useful in the packaging arts. Paper-paper laminates are also extremely useful and can be employed in the manufacture of heavy duty multiwall bags.

The above descriptions and particularly the examples are set forth for purposes of illustration only. Many variations and modifications thereof will be apparent to those skilled in the art and can be made without departing from the spirit and the scope of the invention herein described.

We claim:

1. An article of manufacture bearing on at least one surface thereof an ethylene polymer prepared by the alkaline hydrolysis of an ethylene-alkyl acrylate polymer and having recurring units of the structure:

(a) $-CH_2-CH_2-$ (b) $-CH_2-\overset{R}{\underset{|}{C}}-$
$\phantom{(b)\quad -CH_2-}\overset{\|}{\underset{\|}{C}}-OR_1$
$\phantom{(b)\quad -CH_2-C-}O$ and optionally units of the structure (c) $-CH_2-\overset{R}{\underset{|}{C}}-$
$\phantom{(c)\quad -CH_2-}C-N-R_2$
$\phantom{(c)\quad -CH_2-C}\|\phantom{-N}|$
$\phantom{(c)\quad -CH_2-}O\phantom{-N-}R_3$ and/or (d) $-CH_2-\overset{R}{\underset{|}{C}}-$
$\phantom{(d)\quad -CH_2-}C-O-R_4$
$\phantom{(d)\quad -CH_2-}\|$
$\phantom{(d)\quad -CH_2-}O$ wherein R is selected from the group consisting of hydrogen and alkyl groups, $R_1$ is a cation selected from the group consisting of the alkali metals, ammonium, substituted ammonium, quaternary ammonium, magnesium, calcium and aluminum cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group, the total of said units (b), (c) and (d) being present in a ratio from about 0.01 to about 0.5 mole per mole of units (a); said units (b) constituting at least 10 mole % of the total of units (b), (c) and (d);

and wherein said article comprises a material selected from the group consisting of
1. cellulose
2. cellulose esters 3. cellulose ethers
4. metal
5. thermoplastic olefin polymers containing in polymerized form at least 25 mole percent of a 2 to 4 carbon atom alpha monoolefin,
6. thermoplastic chloroolefin polymers containing in polymerized form at least 25 mole percent of a monomer of the group consisting of vinyl chloride and vinylidine chloride,
7. thermoplastic acrylate ester polymers containing in polymerized form at least 25 mole percent of a monomer of the group consisting of esters of acrylic acid and esters of methacrylic acid,
8. thermoplastic polyamide polymers, and
9. thermoplastic polyester polymers.

2. The article of manufacture of claim 1 wherein said article is a film and comprises a material selected from the group consisting of:
1. thermoplastic olefin polymers containing in polymerized form at least 25 mole percent of a 2 to 4 carbon atom alpha monoolefin,
2. thermoplastic chloroolefin polymers containing in polymerized form at least 25 mole percent of a monomer of the group consisting of vinyl chloride and vinylidene chloride,
3. thermoplastic acrylate ester polymers containing in polymerized form at least 25 mole percent of a monomer of the group consisting of esters of acrylic acid and esters of methacrylic acid,
4. thermoplastic polyamide polymers, and
5. thermoplastic polyester polymers.

3. An article of manufacture bearing on at least one surface thereof an ethylene polymer having recurring units of the structure:

(a)

(b)

and optionally units of the structure (c)

and/or (d)

wherein R is selected from the group consisting of hydrogen and alkyl groups, $R_1$ is a cation selected from the group consisting of ammonium, substituted ammonium, quaternary ammonium and metallic cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group, the total of said units (b), (c) and (d) being present in a ratio from about 0.01 to about 0.5 mole per mole of units (a); said units (b) constituting at least 10 mole % of the total of units (b), (c) and (d);

and wherein said article comprises a material selected from the group consisting of
1. cellulose,
2. cellulose esters,
3. cellulose ethers,
4. metal,
5. thermoplastic olefin polymers containing in polymerized form at least 25 mole percent of a 2 to 4 carbon atom alpha monoolefin,
6. thermoplastic chloroolefin polymers containing in polymerized form at least 25 mole percent of a monomer of the group consisting of vinyl chloride and vinylidine chloride,
7. thermoplastic acrylate ester polymers containing in polymerized form at least 25 mole percent of a monomer of the group consisting of esters of acrylic acid and esters of methacrylic acid,
8. thermoplastic polyamide polymers, and
9. thermoplastic polyester polymers.

4. The article of manufacture of claim 3 wherein said $R_1$ cation is selected from the group consisting of the alkali metals, ammonium, substituted ammonium, quaternary ammonium, magnesium, calcium and aluminum.

5. The article of manufacture of claim 3 wherein $R_2$ and $R_3$ are hydrogen and wherein $R_1$ is selected from the group consisting of sodium and potassium.

6. The article of manufacture of claim 3 wherein said article is a film comprising a material selected from the group consisting of:
1. thermoplastic olefin polymers containing in polymerized form at least 25 mole percent of a 2 to 4 carbon atom alpha monoolefin,
2. thermoplastic chloroolefin polymers containing in polymerized form at least 25 mole percent of a monomer of the group consisting of vinyl chloride and vinylidine chloride,
3. thermoplastic acrylate ester polymers containing in polymerized form at least 25 mole percent of a monomer of the group consisting of esters of acrylic acid and esters of methacrylic acid,
4. thermoplastic polyamide polymers, and
5. thermoplastic polyester polymers.

7. The article of manufacture of claim 3 wherein said article comprises a material selected from the group consisting of ethylene homopolymer, regenerated cellulose, metal, and paper.

8. An article of manufacture bearing on at least one surface thereof an ethylene polymer having recurring units of the structure:

(a)  $-CH_2-CH_2-$ (b)  $-CH_2-\underset{\underset{O}{\overset{\|}{C-OR_1}}}{\overset{R}{\underset{|}{C}}}-$ (c)  $-CH_2-\underset{\underset{O\ R_3}{\overset{\|}{C-N-R_2}}}{\overset{R}{\underset{|}{C}}}-$ and optionally units of the structure (d)  $-CH_2-\underset{\underset{O}{\overset{\|}{C-O-R_4}}}{\overset{R}{\underset{|}{C}}}-$ wherein R is selected from the group consisting of hydrogen and alkyl groups, $R_1$ is a cation selected from the group consisting of the alkali metals, ammonium, substituted ammonium, quaternary ammonium, magnesium, calcium and aluminum cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group, the total of said units (b), (c) and (d) being present in a ratio from about 0.01 to about 0.5 mol per mol of units (a); said units (b) consituting at least 10 mole % of the total of units (b), (c) and (d);

and wherein said article comprises a material selected from the group consisting of:
1. cellulose,
2. cellulose esters,
3. cellulose ethers,
4. metal,
5. thermoplastic olefin polymers containing in polymerized form at least 25 mole percent of a 2 to 4 carbon atom alpha monoolefin,
6. thermoplastic chloroolefin polymers containing in polymerized form at least 25 mole percent of a monomer of the group consisting of vinyl chloride and vinylidine chloride,
7. thermoplastic acrylate ester polymers containing in polymerized form at least 25 mole percent of a monomer of the group consisting of esters of acrylic acid and esters of methacrylic acid,
8. thermoplastic polyamide polymers, and
9. thermoplastic polyester polymers.

9. An article of manufacture comprising a film layer of a vinylidene chloride copolymer bearing on at least one surface thereof an ethylene polymer having recurring units of the structure:

(a)  $-CH_2-CH_2-$ and (b)  $-CH_2-\underset{\underset{O}{\overset{\|}{C-OR_1}}}{\overset{R}{\underset{|}{C}}}-$ wherein R is selected from the group consisting of hydrogen and alkyl groups, $R_1$ is a cation selected from the group consisting of ammonium, substituted ammonium, quaternary ammonium, sodium, potassium, lithium, magnesium, calcium and aluminum ions, the ethylene content of said polymer being at least 67 mole percent based upon said ethylene polymer, said units (b) being present in a ratio from about 0.01 to about 0.5 mole per mole of units (a).

10. A laminated structure comprising a plurality of laminae bonded together with an ethylene polymer; said laminae being fabricated from materials selected from the group consisting of:
1. cellulose
2. cellulose esters
3. cellulose ethers
4. metals
5. thermoplastic olefin polymers containing in polymerized form at least 25 mole percent of a 2 to 4 carbon atom alpha monoolefin,
6. thermoplastic chloroolefin polymers containing in polymerized form at least 25 mole percent of a monomer of the group consisting of vinyl chloride and vinylidine chloride,
7. thermoplastic acrylate ester polymers containing in polymerized form at least 25 mole percent of a monomer of the group consisting of esters of acrylic acid and ester of methacrylic acid,
8. thermoplastic polyamide polymers, and
9. thermoplastic polyester polymers;

said ethylene polymer having been prepared by the alkaline hydrolysis of an ethylene-alkyl acrylate polymer and having recurring units of the structure:

(a)  $-CH_2-CH_2-$ (b)  $-CH_2-\underset{\underset{O}{\overset{\|}{C-OR_1}}}{\overset{R}{\underset{|}{C}}}-$ and optionally units of the structure (c)

and/or (d)

wherein R is selected from the group consisting of hydrogen and alkyl groups, $R_1$ is a cation selected from the group consisting of ammonium, substituted ammonium, quaternary ammonium and metallic cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group; the total of said units (b), (c) and (d) being present in a ratio of from about 0.01 to about 0.5 mole per mole of units (a); said units (b) constituting at least 10 mole % of the total of said units (b), (c) and (d).

11. A laminated structure comprising a pair of sheets of paper bonded together with an ethylene polymer having recurring units of the structure:

(a) $-CH_2-CH_2-$ (b)

and optionally units of the structure (c)

and/or (d)

wherein R is selected from the group consisting of hydrogen and alkyl groups, $R_1$ is a cation selected from the group consisting of ammonium, substituted ammonium, quaternary ammonium and metallic cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group; the total of said units (b), (c) and (d) being present in a ratio of from about 0.01 to about 0.5 mole per mole of units (a); said units (b) constituting at least 10 mole % of the total of said units (b), (c) and (d).

12. A laminated structure comprising a sheet of paper bonded to a sheet of aluminum foil with an ethylene polymer having recurring units of the structure:

(a) $-CH_2-CH_2-$ (b)

and optionally units of the structure (c)

and/or

(d)

wherein R is selected from the group consisting of hydrogen and alkyl groups, $R_1$ is a cation selected from the group consisting of ammonium, substituted ammonium quaternary ammonium and metallic cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group; the total of said units (b), (c) and (d) being present in a ratio of from about 0.01 to about 0.5 mole per mole of units (a); said units (b) constituting at least 10 mole % of the total of said units (b), (c) and (d).

13. A laminated structure comprising a sheet of paper bonded to a film of an ethylene homopolymer with an ethylene polymer having recurring units of the structure:

and optionally units of the structure and/or wherein R is selected from the group consisting of hydrogen and alkyl groups, $R_1$ is a cation selected from the group consisting of ammonium, substituted ammonium, quaternary ammonium and metallic cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group; the total of said units (b), (c) and (d) being present in a ratio of from about 0.01 to about 0.5 mole per mole of units (a); said units (b) constituting at least 10 mole % of the total of said units (b), (c) and (d).

14. A three layer, flexible packaging sheet material characterized by strength, durability, good heat sealability and oil resistance consisting essentially of
 a. paper substrate having at least 25 pounds per 3,000 square feet basis weight,
 b. a thin layer of thermoplastic ionomer resin present in the amount of at least 6 pounds, and
 c. a layer of polyethylene,
said ionomer resin and polyethylene layers being immediately adjacent and extending substantially continuously over one side of said substrate.

15. An article of manufacture comprising a heat-sealable film structure including a base layer of a self-supporting film of organic thermoplastic polymeric material having a heat-sealable coating on at least one surface thereof of an ionic copolymer selected from the class consisting of direct copolymers of
 ethylene, the ethylene content of said copolymer being at least 67 mol percent based upon said copolymer,
 and an alpha, beta-ethylenically unsaturated monocarboxylic acid, the acid monomer content of said copolymer being from 1 to 33 mol percent based upon the copolymer, said copolymer containing uniformly distributed throughout said copolymer a metal ion selected from the group consisting of sodium, potassium, lithium, magnesium, calcium and aluminum ions wherein substantially all of said monovalent carboxylic acid copolymer is neutralized by said metal ion and exists in an ionic state.

16. The article of manufacture of claim 15 wherein said base layer of the self-supporting film structure is a polyolefin.

17. The article of manufacture of claim 15 wherein said base layer of a self-supporting film structure is polyethylene terephthalate.

18. The article of manufacture of claim 15 wherein said base layer of a self-supporting film structure is a polyamide.

19. The article of manufacture of claim 15 wherein said heat-sealable coating of an ionic copolymer is characterized by an acid monomer content of between about 3.8 and about 13 mol percent, based upon the total weight of said ionic copolymer.

20. The article of manufacture of claim 15 wherein said monocarboxylic acid in said ionic copolymer coating is methacrylic acid.

21. An article of manufacture comprising a heat-sealable film structure including a base layer of a self-supporting film of organic thermoplastic polymeric material having a heat-sealable coating on at least one surface thereof of an ionic copolymer selected from the class consisting of direct copolymers of
 ethylene, the ethylene content of said copolymer being at least 67 mol percent based upon said copolymer, and an alpha, beta-ethylenically unsaturated monocarboxylic acid, the acid monomer content of said copolymer being from about 1 to 33 mol percent based upon the copolymer,
 said copolymer containing uniformly distributed throughout said copolymer an alkali metal ion wherein substantially all of said monovalent carboxylic acid copolymer is neutralized by said alkali metal ion and exists in an ionic state;
said ionic copolymer having been prepared by heating a mixture of (1) a copolymer of ethylene and an alkyl ester of an alpha, beta-ethylenically unsaturated monocarboxylic acid, said copolymer having a melt index of about 1.7, containing from about 1 to 33 mol percent ester and balance ethylene, (2) water, and (3) an alkali metal hydroxide in an amount at least stoichiometrically equivalent to the ester content of (1), for a time sufficient to hydrolyze substantially all of the ester groups of (1).

22. The article of manufacture of claim 21 wherein said base layer of the self-supporting film structure is a polyolefin.

23. The article of manufacture of claim 21 wherein said base layer of a self-supporting film structure is polyethylene terephthalate.

24. The article of manufacture of claim 21 wherein said base layer of a self-supporting film structure is a polyamide.

25. The article of manufacture of claim 21 wherein said heat-sealable coating of an ionic copolymer is characterized by an acid monomer content of between about 3.8 and about 13 mol percent, based upon the total weight of said ionic copolymer.

26. The article of manufacture of claim 21 wherein said monocarboxylic acid in said ionic copolymer coating is methacrylic acid.

27. A laminated structure comprising a pair of sheets of polyethylene bonded together with an ethylene polymer having recurring units of the structure:

(a) $-CH_2-CH_2-$ (b) $-CH_2-\underset{\underset{O}{\overset{\|}{C-OR_1}}}{\overset{R}{\underset{|}{C}}}-$ and optionally units of the structure (c) $-CH_2-\underset{\underset{O\ R_3}{\overset{\|\ \ |}{C-N-R_2}}}{\overset{R}{\underset{|}{C}}}-$ and/or (d) $-CH_2-\underset{\underset{O}{\overset{\|}{C-O-R_4}}}{\overset{R}{\underset{|}{C}}}-$ wherein R is selected from the group consisting of hydrogen and alkyl groups, $R_1$ is a cation selected from the group consisting of ammonium, substituted ammonium, quaternary ammonium and metallic cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group; the total of said units (b), (c) and (d) being present in a ratio of from about 0.01 to about 0.5 mole per mole of units (a); said units (b) constituting at least 10 mole % of the total of said units (b), (c) and (d).

28. A film of a polyamide polymer having affixed to at least one of its surfaces a coating of an ethylene-acrylic acid copolymer containing from about 5 to about 39.1 weight percent of acrylic acid, said coating having affixed to its surface a film of a normally solid polyolefinic hydrocarbon polymer.

29. The article of claim 28 wherein said polyolefinic hydrocarbon is polyethylene.

30. The article of claim 28 wherein said polyolefinic hydrocarbon is polyethylene having a density from about 0.910 to about 0.940 gram per cc.

31. The article of claim 28 wherein said polyamide polymer is selected from the group consisting of polycaproamide and poly-11-undecanoamide.

32. In a continuous method for extrusion coating an ethylene homopolymer onto paperboard in which an ethylene homopolymer is continuously extruded into film, the hot extruded ethylene homopolymer film is continuously laid down on a moving sheet of paperboard stock and the ethylene homopolymer coated paperboard stock is passed through a zone in which pressure is applied to the assembly to firmly bond the ethylene homopolymer to the paperboard stock; the improvement which comprises providing a substantially uniform coating of an ethylene polymer on the surface of the paperboard stock that is to be coated with the ethylene homopolymer; said ethylene polymer having been prepared by the alkaline hydrolysis of an ethylene-alkyl acrylate polymer and having recurring units of the structure:

(a) $-CH_2-CH_2-$ (b) $-CH_2-\underset{\underset{O}{\overset{\|}{C-OR_1}}}{\overset{R}{\underset{|}{C}}}-$ and optionally units of the structure (c) $-CH_2-\underset{\underset{O\ R_3}{\overset{\|\ \ |}{C-N-R_2}}}{\overset{R}{\underset{|}{C}}}-$ and/or (d) $-CH_2-\underset{\underset{O}{\overset{\|}{C-O-R_4}}}{\overset{R}{\underset{|}{C}}}-$ wherein R is selected from the group consisting of hydrogen and alkyl groups, $R_1$ is a cation selected from the group consisting of ammonium, substituted ammonium, quaternary ammonium and metallic cations, $R_2$ and $R_3$ are independently selected from the group consisting of hydrogen, hydroxyalkyl and hydrocarbon groups with the further provision that $R_2$ and $R_3$ may be combined with N in a heterocyclic group, and $R_4$ is a hydrocarbon group; the total of said units (b), (c) and (d) being present in a ratio of from about 0.01 to about 0.5 mole per mole of units (a); said units (b) constituting at least 10 mole % of the total of said units (b), (c) and (d).

* * * * *